Aug. 11, 1953  G. W. TIDD  2,648,386
HELICOPTER TRANSMISSION MECHANISM
Filed March 29, 1948
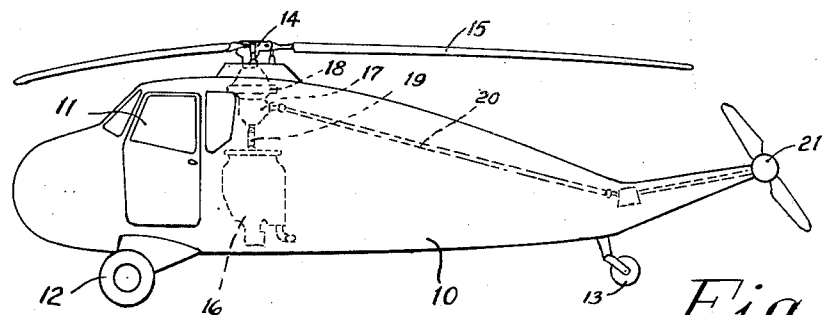
Fig. 1.
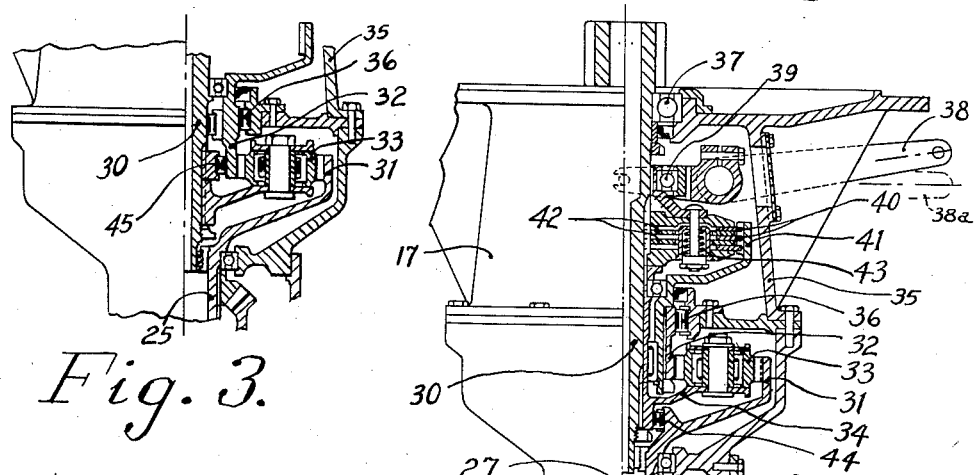
Fig. 3.
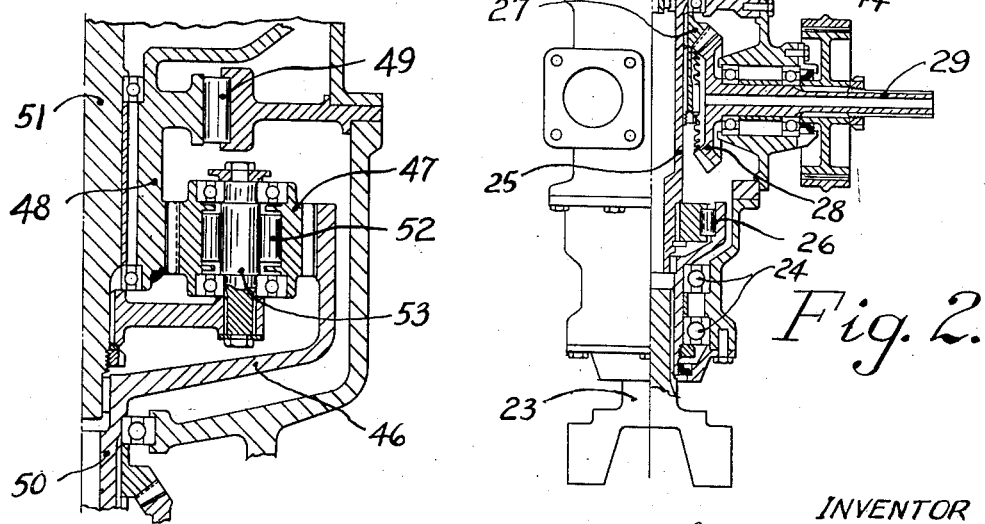
Fig. 4.
Fig. 2.
INVENTOR
Gage W. Tidd
BY Harris S. Campbell
ATTORNEY

UNITED STATES PATENT OFFICE 2,648,386

HELICOPTER TRANSMISSION MECHANISM

Gage W. Tidd, Doylestown, Pa., assignor to Harris S. Campbell, Bryn Athyn, Pa.

Application March 29, 1948, Serial No. 17,645

7 Claims. (Cl. 170—135.22)

This invention relates to transmission systems for helicopters and is particularly concerned with multiple speed units for driving helicopter rotors at different speed ratios.

In helicopters, it is desirable that during hovering operation the main rotor be driven at a comparatively slow speed of rotation in order to provide the greatest lift for a given amount of power. For example, rotational speeds which give rotor tipspeeds of from 350 to 450 ft./sec. are suitable. For high forward speed flight, it is desirable to have an increased tipspeed in order to prevent tip stall on the retreating blade which may cause undesirable vibration in the aircraft.

In many helicopters, an auxiliary rotor such as an antitorque tail rotor is used in addition to the main lifting rotor. The drive for this auxiliary rotor is normally coupled with the transmission for the main rotor in a fashion which permits the main rotor to drive the tail rotor during autorotational operation when engine power is removed. With a transmission having more than one speed ratio, it is desirable that full operational speed on the auxiliary antitorque rotor be maintained during slow speed operation of the main rotor. The reason for this is that during this slow speed operation, the highest torque is developed by the main rotor and this torque must be overcome by the thrust of the auxiliary rotor. Therefore, full speed of the auxiliary rotor is desired at this time in order to develop its maximum thrust.

It is a primary object of the present invention to provide for the drive of such auxiliary rotors in a fashion which will allow maximum speed operation of the auxiliary rotor for slow speed operation on the main rotor and at the same time provide for suitable drive to the tail rotor during periods of autorotational operation of the main rotor.

It is an object of the present invention to provide in conjunction with a two speed transmission unit which is capable of transmitting torque in only one direction, during low speed operation, means for eliminating the speed reduction action of the unit during periods of reverse torque transfer.

A specific object of the present invention is the provision of an overrunning device in association with a two speed transmission for helicopters, which device operates under action of reverse torque from the main rotor, such as during autorotational operation or brake application. During such reverse torque drive the overrunning device becomes the medium for transmitting driving torque to the input shaft of the two speed unit and thereby provides the drive for the auxiliary rotor connected to this input shaft.

The present invention provides for the back drive features for an auxiliary rotor or the like as disclosed in the co-pending application of Harris S. Campbell, Serial No. 17,707, filed March 29, 1948, but accomplishes this back drive in certain specific ways.

How the foregoing and other objects and advantages of this invention are accomplished will be clear from the following description of the drawing in which—

Figure 1 is a side elevational view of an aircraft of the type to which the present invention is applicable.

Figure 2 is a side elevational view, partly in section, of a portion of a transmission system illustrating features of the present invention.

Figure 3 is a view of a portion of the two speed mechanism illustrating an alternate construction.

Figure 4 is a view of a portion of the two speed unit showing another form of construction.

In Figure 1 there is illustrated a single lifting rotor helicopter having a body 10 with an occupants' compartment at 11 in the forward portion thereof. A landing gear consisting of forward wheels 12 and rear wheel 13 is provided for support of the aircraft on the ground.

A sustaining rotor having a rotor hub 14 and rotor blades 15 connected thereto is attached to the fuselage 10. During flight the rotor blades 15 are driven by means of the engine 16 through the medium of transmission units 17 and 18. A shaft 19 connects the engine with the transmission unit and a drive shaft 20 transmits the power from the transmission unit 17 to the tail rotor 21 which is mounted at the rear end of fuselage 10.

The portion of the transmission unit indicated at 18 houses the main reduction gearing required to provide proper rotational speed for the rotor. A considerable reduction from the engine shaft speed is required, in many instances 10:1 or more reduction being needed, depending upon the size of the rotor.

In Figure 2, the portion of the transmission below the main gear reduction unit 18 is illustrated. This includes the two speed unit which is housed in the part of the transmission illustrated at 17. The drive to the transmission is from external shaft 23 which may be driven from the engine through a suitable engageable clutch. Shaft 23 is supported in the lower end of the transmission housing by means of bearings 24 and drives a shaft 25 through the medium of overrunning clutch 26. Overrunning clutch 26 is provided to permit continued operation of the transmission system in the event of slowing down of the engine such as when the throttle is closed or in the event of engine failure. In this case, the main rotor may autorotate freely by virtue of the overrunning clutch 26. The tail rotor drive take-off is connected to shaft 25 by means of bevel gears 27 and 28, the latter of which is attached to take-off shaft 29.

Shaft 25 is the input or driving shaft for the two speed rotor under normal power operation. When the two speed rotor is operating in low ratio condition, that is, when the two speed friction clutch is in disengaged position, the shaft 25 drives the driven or output shaft 30 of the two speed unit at a reduced speed. This is accomplished through the medium of the planetary gearing consisting of the outer or driving gear shown at 31 attached to shaft 25, the inner gear shown at 32, and the planet gears 33 which are attached to a plate or spider 34 connected to driven shaft 30. During this low speed operation, the inner planetary gear which is the reaction gear, is held stationary with respect to the housing 35 by means of an overrunning clutch 36. Thus, the planetary gearing is effective to drive the output shaft 30 at a speed which, in the present gearing proportions, amounts to a reduction of approximately 1.4 to 1. The upper end of driven shaft 30 is supported in a bearing 37 and drives the main rotor through the medium of the main reduction gearing, which is located in the portion of the housing shown at 18 in Figure 1.

In order to drive the output shaft 30 of the two speed unit at high speed ratio, the friction clutch unit is engaged by means of lever 38 operating through thrust bearing 39. The clutch with its lever 38 as shown in full-line position, is in engaged position. Here the plates 40 attached to the outer shell 41 which is connected to the inner gear 32, are forced by means of compression springs 43 into frictional engagement with plates 42 which are splined to driven shaft 30. During engagement of the clutch, the shaft to which gear 32 is connected is caused to rotate with driven shaft 30 so that the planet gears are locked about their own axes with the result that direct 1 to 1 drive is established between shaft 25 and shaft 30. The overrunning clutch 36 permits forward operation of the gear shaft 32.

In order to return to slow speed operation from high speed operation, the operator disengages the clutch by means of suitable connections to lever 38 and upon movement of lever 38 to position 38a, the clutch is fully released permitting relative rotation of the two sets of discs. The gear reactions at the planetary gear set immediately cause stoppage of the inner gear 32 due to the reaction of overrunning clutch 36 against the housing, with the result that the transmission is again returned to slow speed operation with the planetary reduction effective.

Because of the construction of the overrunning or freewheel clutch 36, when the two speed unit is in low ratio operation, torque can be transferred only from the input shaft 25 to the output shaft 30. In case of power failure the shaft 30 is driven from the main rotor by virtue of the aerodynamic forces acting on it to cause autorotation. However, drive between shaft 30 and shaft 25, because of the reversal of torque, cannot occur through the planetary gearing because the overrunning device 36 prevents transfer of this reversed torque. In order to provide for drive of the shaft 25 and the power take-off 29, additional means must be provided to transfer this opposite torque. In the arrangement illustrated in Figure 2, an overrunning clutch 44 is located near the lower end of shaft 30, and reacting between it and the upper end of shaft 25 in a fashion such as when shaft 25 tends to operate at a slower speed than shaft 30, the freewheeling unit 44 automatically becomes effective and provides for transfer of torque from shaft 30 to shaft 25. It will be evident that upon resumption of normal torque, such as with the application of power, shaft 25 may increase its speed with respect to the speed of shaft 30 and drive through the planetary gearing since the clutch 44 is ineffective in this direction and permits shaft 25 to operate at speeds faster than shaft 30. Thus the continued operation of auxiliary drive 29 is assured even though failure of power to shaft 25 occurs. It will be noted that overrunning unit 26 permits continued operation of shaft 25 even though the power input shaft 23 from the engine may be stopped or operating at low speed. Rotor brake is on shaft 29.

In Figure 3, a somewhat different arrangement is provided for obtaining the drive back through the two speed unit to the auxiliary rotor take-off. The two speed mechanism is essentially the same as in the case of Figure 2, being composed of the planetary gear train (members 31, 32 and 33) with the overrunning reaction clutch 36 between gear member 32 and housing. To provide for the reversed torque operation, an additional overrunning unit 45 is located between the output or driven shaft 30 and the reaction gear member 32. Overrunning clutch 45 is arranged to operate to prevent gear member 32 from running forward at a speed in excess of the speed of output shaft 30. When the torque is reversed from the normal driving direction, shaft 30 tends to drive back through the planetary gearing to drive shaft 25. However, in so doing, the reactions at the gears 33 and 32 are reversed with the effect that gear 32 tends to rotate in the same direction as shaft 30, this being permitted by overrunning clutch 36. Overrunning clutch 45, however, prevents the speed of gear member 32 from exceeding the speed of shaft 30, with the result that shaft 30 can drive back through the planetary gear system at a 1 to 1 ratio, thus driving shaft 25 so that power can be transmitted to the auxiliary take-off.

Figure 4 shows another method of providing for the transmission of reversed torque through the planetary reduction system when it is conditioned for low speed operation, that is, when the two speed clutch unit is disengaged. In this case, the same general arrangement for gearing may be used, involving driving gear 46, planet gears 47 and reaction gear member 48. The reaction overrunning clutch between gear member 48 and the housing is indicated at 49. Thus the driving shaft 50 can transmit torque to the driven shaft 51, the latter being driven at a slower speed than shaft 50. Under the condition of reversed torque such as during autorotational operation or application of the rotor brake, while the direction of rotation continues the same, shaft 51 tends to drive shaft 50. This would cause an overdrive to occur on the reaction gear member 48, and due to overrunning clutch 49, such overspeeding could occur unrestricted, thus preventing effective transmission of torque from shaft 51 to shaft 50. As shown in Figure 4, an overrunning clutch member 52 is supplied in association with each planet gear 47. This overrunning clutch is arranged to allow the planet gears 47 to rotate in a forward direction such as required during normal powered drive when shaft 50 is driving shaft 51 at reduced speed. Upon reversal of torque, when the tendency is to overdrive reaction gear member 48, a reversal in the direction of rotation of planet gears 47 on their own axes would normally occur. The overrunning clutches 52 which react between axle members 53 and the gears 47, prevent such reversed rotation of gears 47 from occurring, thus in effect locking the gears during reverse torque operation. This locking produces a 1 to 1 drive relationship when shaft 51 tends to drive shaft 50. Thus shaft 50 may effectively transmit the power necessary for operation of the auxiliary rotor driveshaft which is connected to shaft 50 during autorotation and rotor braking operations.

From the above description, it will be clear that I have provided a simple means for transmission of reverse torque through a helicopter multiple speed unit. With the arrangement of the main overrunning device which permits the transmission and rotor to freewheel with respect to the engine driving shaft in case of engine failure, and the use of a freewheeling reaction device in connection with the two speed unit, the provision of additional freewheeling means is used to permit driving of the shaft, which is normally the input shaft, from the rotor side of the two speed unit. By placing the third overrunning means in proper position with respect to the members of the planetary transmission, or with respect to the input and output shafts, an unusually simple and satisfactory means for supplying the needed power for operation of auxiliary drives in proper fashion, is provided.

I claim:

1. A helicopter having a sustaining rotor, a power plant, said rotor being capable of being operated either from said power plant or by aerodynamic actuation during flight, a transmission system between said power plant and said rotor including a drive from the power plant having a freewheel clutch to permit the rotor to continue operation under aerodynamic forces upon reduction of the engine speed below rotor operational speed, a two speed transmission unit including a housing, planetary gearing, an input shaft to said two speed unit normally driven by said power plant through said freewheel clutch, auxiliary rotor take-off gearing connected to said input shaft, an output shaft from said two speed unit to said rotor, a second freewheel device engaging said housing and an element of said two speed unit and arranged to transmit a uni-directional torque therebetween to cause operation of said planetary gearing to drive said output shaft at a reduced speed, and a third freewheel device engaging said input shaft and an element of said two speed unit and arranged to transmit a uni-directional torque therebetween to cause drive of said input shaft when said output shaft is being driven by said rotor.

2. A helicopter having a sustaining rotor, a power plant, said rotor being capable of being driven either by said power plant or by aerodynamic forces during flight, a transmission system between said power plant and said rotor including a two speed unit to permit drive of said rotor by said power plant at different speeds, said two speed unit having input and output shafts, planetary gearing interconnecting said shafts to provide low speed drive of the sustaining rotor, a housing, a freewheel device reacting between an element of said planetary gearing and said housing to provide for operation of the gearing when being driven in low ratio, an auxiliary drive take-off connected to the input shaft, a second freewheel device located between the power plant and said input shaft and a third freewheel device reacting between two elements of said two speed unit to provide unidirectional drive from said output shaft to said input shaft upon reversal of normal driving torque when said rotor is being aerodynamically driven.

3. For a helicopter having a sustaining rotor and a power plant, a two speed transmission device having a housing, an input shaft from the power plant and an output shaft to the rotor, planetary gearing interposed between said shafts, a freewheel device reacting between said gearing and said housing when being driven by said input shaft, a second freewheel device reacting directly between said shafts when said output shaft is driving said input shaft, a third freewheel device located in said input shaft to permit said transmission to overrun said power plant and an auxiliary rotor drive connected to said input shaft between said second and third freewheel devices.

4. For a helicopter having a sustaining rotor and a power supply, a two speed transmission having a housing, input and output shafts, planetary gearing including a reaction gear member and a planet gear, a freewheel device reacting between said member and said housing during drive from the input shaft, a second freewheel device reacting between said output shaft and another part of said transmission during drive from the output shaft, a third freewheel device located in said input shaft to permit a portion of said shaft to overrun said power supply, and an auxiliary rotor drive connected between said second and third freewheel devices.

5. A helicopter having a sustaining rotor, a power plant, said rotor being operable either by said power plant or by aerodynamic actuation during flight, a transmission system between said power plant and said rotor including a drive from the power plant having a freewheel clutch to permit the rotor to continue operation under aerodynamic forces upon reduction of engine speed below operational speed, a two speed transmission including a housing, a planet gear, a planet gear support, a sun gear, an input shaft to said two speed unit normally driven by said power plant through said freewheel clutch, an auxiliary rotor power take-off connected to said input shaft, an output shaft from said two speed unit to said sustaining rotor, a second freewheel device reacting between said sun gear and said housing to cause operation of said output shaft at reduced speed, and a third freewheel device engaging two elements of said two speed unit and arranged to transmit unidirectional torque therebetween in a direction to provide drive from said output shaft to said input shaft.

6. A construction in accordance with claim 2 in which the planetary gearing incorporates a reaction gear member and in which the first mentioned freewheel device reacts between the reaction gear member and the housing.

7. A construction in accordance with claim 2 in which the planetary gearing includes a planet gear, a planet gear supporting structure, the third freewheel device being located to react between the planet gear and its supporting structure.

GAGE W. TIDD.

References Cited in the file of this patent

UNITED STATES PATENTS

| Number | Name | Date |
|---|---|---|
| 1,692,546 | Dolne-Dehan | Nov. 20, 1928 |
| 1,842,798 | Raven | Jan. 26, 1932 |
| 2,023,018 | Hamilton | Dec. 3, 1935 |
| 2,262,747 | Banker | Nov. 18, 1941 |
| 2,269,916 | Price | Jan. 13, 1942 |
| 2,370,131 | Banker | Feb. 27, 1945 |
| 2,384,996 | Hanson | Sept. 18, 1945 |
| 2,397,941 | Birkigt | Apr. 9, 1946 |
| 2,402,725 | Birkigt | June 25, 1946 |
| 2,495,988 | Sheppard | Jan. 31, 1950 |